US009487249B2

(12) United States Patent
Scott et al.

(10) Patent No.: US 9,487,249 B2
(45) Date of Patent: Nov. 8, 2016

(54) CAB SUSPENSION SYSTEM FOR A WORK VEHICLE WITH CIRCUMFERENTIALLY EXTENDING BUMP STOPS

(71) Applicant: CNH Industrial America, LLC, New Holland, PA (US)

(72) Inventors: Shane M. Scott, Bolingbrook, IL (US); Salvatore Virgilio, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/649,948

(22) PCT Filed: Sep. 13, 2013

(86) PCT No.: PCT/US2013/059651
§ 371 (c)(1),
(2) Date: Jun. 5, 2015

(87) PCT Pub. No.: WO2014/099059
PCT Pub. Date: Jun. 26, 2014

(65) Prior Publication Data
US 2015/0307140 A1    Oct. 29, 2015

Related U.S. Application Data

(60) Provisional application No. 61/740,123, filed on Dec. 20, 2012.

(51) Int. Cl.
*B62D 33/10* (2006.01)
*B62D 24/04* (2006.01)
(Continued)

(52) U.S. Cl.
CPC .......... *B62D 33/0604* (2013.01); *B62D 24/04* (2013.01); *B62D 33/10* (2013.01); *E02F 9/166* (2013.01)

(58) Field of Classification Search
CPC .............. B62D 24/04; B62D 33/0604; B62D 33/0608; B62D 33/10; E02F 9/166
USPC .................... 296/1.03, 35.1, 190.01, 190.07; 180/89.12, 89.13
See application file for complete search history.

(56) References Cited

U.S. PATENT DOCUMENTS 2,735,673 A    2/1956 Muller
3,618,693 A    11/1971 Graham
(Continued)

FOREIGN PATENT DOCUMENTS

DE    102008015614    7/2009

OTHER PUBLICATIONS

PCT International Search Report and Opinion. Dated Jan. 2, 2014. (10 Pages).

*Primary Examiner* — Jason S Daniels
(74) *Attorney, Agent, or Firm* — Rickard K. DeMille

(57) ABSTRACT

A cab suspension system for coupling a cab frame to a chassis frame of a work vehicle is disclosed. The chassis frame may include a suspension platform. The suspension system may generally include a pad configured to be coupled to the cab frame and an outer tube extending from the pad in a direction of the suspension platform. The outer tube may define a circumference. Additionally, the suspension system may include a bump stop coupled to the outer tube. The bump stop may extend around a portion of the circumference of the outer tube. Moreover, at least a portion the bump stop may extend below the outer tube such that the bump stop is configured to contact the suspension platform prior to the outer tube when the outer tube is moved in the direction of the suspension platform.

13 Claims, 7 Drawing Sheets

(51) Int. Cl.
 *B62D 33/06* (2006.01)
 *E02F 9/16* (2006.01)

(56) References Cited

U.S. PATENT DOCUMENTS

| | | |
|---|---|---|
| 4,609,583 A | 9/1986 | Breckenfelder |
| 5,467,970 A | 11/1995 | Ratu et al. |
| 5,918,694 A | 7/1999 | Miller et al. |
| 6,010,139 A | 1/2000 | Heyring et al. |
| 6,367,562 B1 | 4/2002 | Mosdal |
| 6,408,970 B1 | 6/2002 | Eng |
| 6,736,381 B2 | 5/2004 | Chesne |
| 6,994,358 B2 | 2/2006 | Roycroft |
| 7,246,846 B2 | 7/2007 | Shiji et al. |
| 7,401,673 B2 | 7/2008 | Fukazawa et al. |
| 7,922,397 B2 | 4/2011 | Beauprez et al. |
| 8,047,587 B2 | 11/2011 | Sawai |
| 8,496,383 B2 | 7/2013 | Viault et al. |
| 8,807,633 B2 | 8/2014 | Milburn et al. |
| 2005/0034336 A1 | 2/2005 | Takemura et al. |
| 2005/0146108 A1 | 7/2005 | Dudding et al. |
| 2008/0129000 A1 | 6/2008 | Munday et al. |
| 2011/0133379 A1 | 6/2011 | Viault et al. |
| 2011/0135434 A1 | 6/2011 | Yoon |
| 2012/0193157 A1* | 8/2012 | Rasset .................. B60R 21/131 180/89.13 |

* cited by examiner

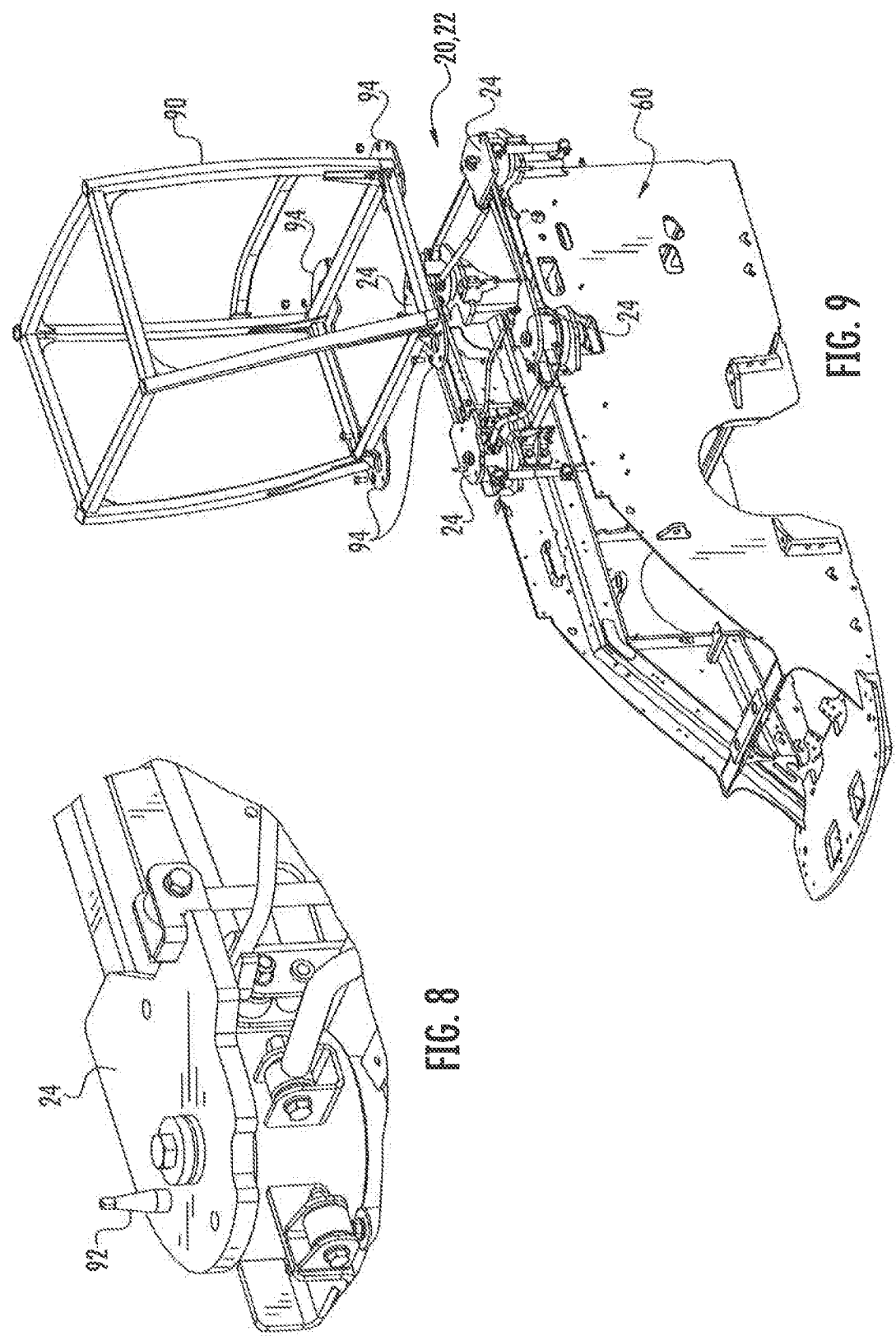

US 9,487,249 B2

CAB SUSPENSION SYSTEM FOR A WORK VEHICLE WITH CIRCUMFERENTIALLY EXTENDING BUMP STOPS

CROSS-REFERENCE TO RELATED APPLICATIONS

This application is a national phase application of International Application No. PCT/US13/59651, filed on Sep. 13, 2013, which is based upon and claims priority to U.S. Provisional Application No. 61/740,123, filed on Dec. 20, 2012, the disclosures of both of which are hereby incorporated by reference herein in their entirety for all purposes.

FIELD OF THE INVENTION

The present subject matter relates generally to work vehicles and, more particularly, to a cab suspension system for a work vehicle having circumferentially extending bump stops.

BACKGROUND OF THE INVENTION

A wide range of off-highway, work vehicles have been developed for various purposes. In smaller work vehicles, seats and other operator supports may be sufficient, and these may be mounted on various forms of springs and other suspension components. However, in larger or more complex works vehicles, such as certain tractors and construction equipment, a partially or fully enclosed cab is more desirable, providing one or more operators with a comfortable location from which the vehicle may be operated. Such cabs, sometimes referred to as "operator environments" also provide a central location to which controls and operator interfaces may be fed, and from which most or all of the vehicle functions may be easily controlled.

Conventional cab mounting systems typically include some type of roll-over protection system (ROPS) designed to prevent the cab from being crushed during a roll-over event. For example, U.S. application Ser. No. 13/528,655, entitled "Cab Suspension System for an Off-Road Vehicle" and filed Jun. 20, 2012, discloses a suspension system including an outer ROPS tube mounted to the cab suspension superstructure and an inner ROPS tube extending from a suspension platform of the chassis frame, with the inner ROPS tube being received within the outer ROPS tube. During a roll-over event, the outer ROPS tube is configured to be displaced relative to the inner ROPS tube until the outer ROPS tube engages or otherwise contacts the suspension platform, thereby preventing any further motion of the cab relative to the chassis frame.

While the above-described suspension system provides numerous advantages, further enhancements may still be made to improve the system. For example, it has been found that the outer ROPS tube may sometimes rub against or otherwise contact the pad during normal operation of the work vehicle, such as when the cab experiences extreme displacements (e.g., displacements in the pitch and/or roll directions) during normal operation.

Accordingly, an improved cab suspension system that prevents such rubbing or contact during normal operation of the work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a cab suspension system for coupling a cab frame to a chassis frame of a work vehicle. The chassis frame may include a suspension platform. The suspension system may generally include a pad configured to be coupled to the cab frame and an outer tube extending from the pad in a direction of the suspension platform. The outer tube may define a circumference. Additionally, the suspension system may include a bump stop coupled to the outer tube. The bump stop may extend around a portion of the circumference of the outer tube. Moreover, at least a portion the bump stop may extend below the outer tube such that the bump stop is configured to contact the suspension platform prior to the outer tube when the outer tube is moved in the direction of the suspension platform.

In another aspect, the present subject matter is directed to a work vehicle including a chassis frame, a cab frame and a suspension system coupled between the chassis frame and the cab frame. The suspension system may include a pad configured to be coupled to the cab frame and an outer tube extending from the pad in a direction of a suspension platform of the chassis frame. The outer tube may define a circumference. Additionally, the suspension system may include a bump stop coupled to the outer tube. The bump stop may extend around a portion of the circumference of the outer tube. Moreover, at least a portion the bump stop may extend below the outer tube such that the bump stop is configured to contact the suspension platform prior to the outer tube when the outer tube is moved in the direction of the suspension platform.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates an enlarged view of one embodiment of a pin arrangement that may be used to facilitate mounting of a cab frame to the suspension system; and FIG. 9 illustrates a perspective view showing a cab frame exploded away from the cab suspension system.

DETAILED DESCRIPTION OF THE INVENTION

Figure 1:
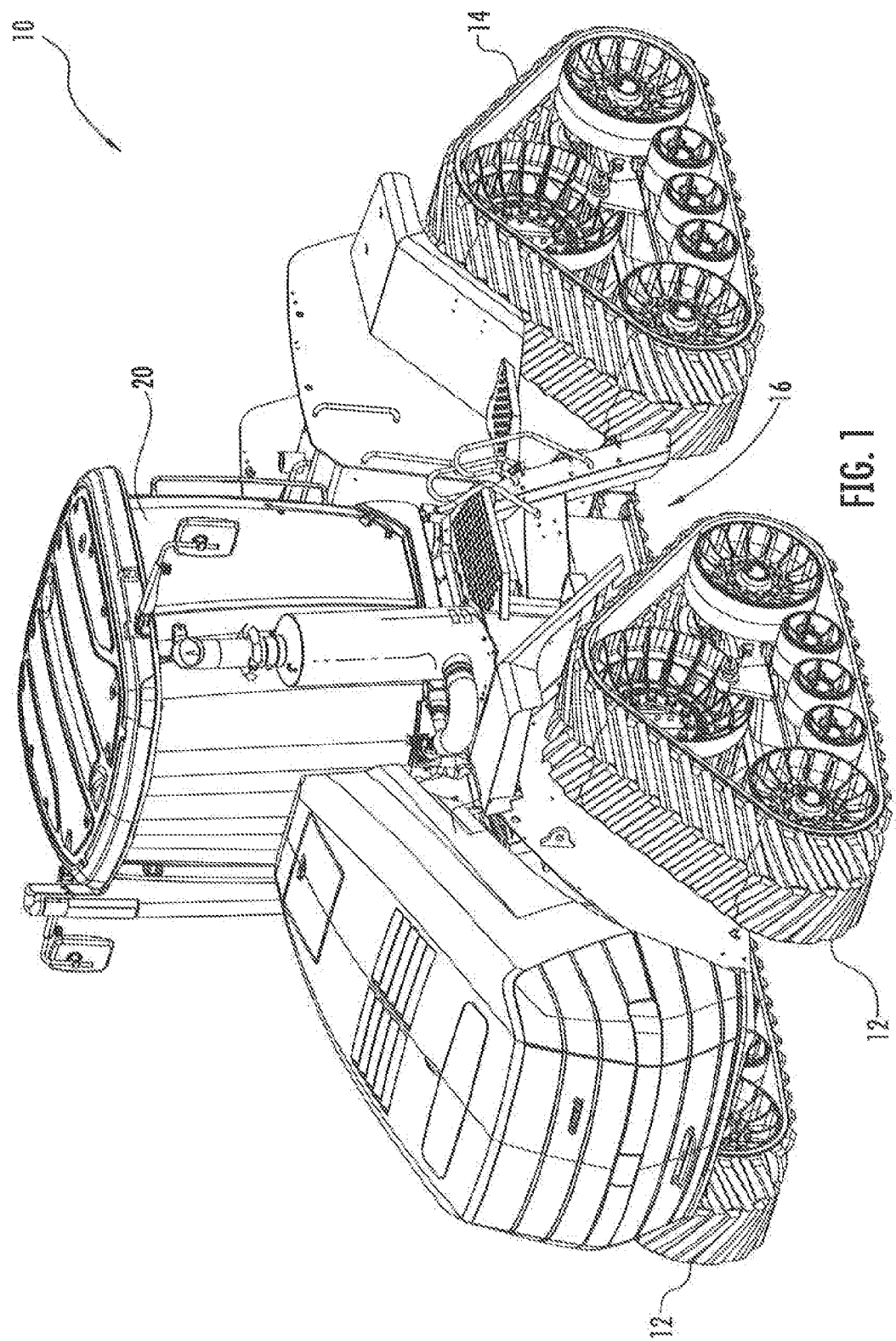
FIG. 1 illustrates a perspective view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a cab suspension system for a work vehicle, such as a tractor, combine, construction vehicle and/or any other suitable off-road vehicle. As will be described below, the disclosed system generally utilizes a four-link system, including rubber isolators and bumpers, springs, dampers, and a torsion bar, for various ride improvement components that combine to absorb normal operating shocks, while gradually increasing resistance to provide soft end of motion. In addition, the system may also utilize circumferentially extending bump stops in order to prevent rubbing and/or contact between certain adjacent components of the system.

In several embodiments, springs captured by rubber end caps may be mounted vertically in the four corners of the system. These springs may allow for spring force control of loading during normal operating vertical motion with isolation of both noise and vibration. In addition, the springs may also provide for roll and pitch resistance.

Additionally, cab roll under normal conditions may be controlled by an antiroll bar mounted on the vehicle frame with drop links connecting to the cab suspension superstructure (i.e., the upper components of the suspension system that connect to the cab frame). The torsion bar may help to keep the cab level by transferring offsetting vertical forces to combat cab roll motion. Moreover, both roll and pitch motions may be dampened by dampers located at the four corners of the suspension system. Motion may be further dampened with increasing cab travel when motion snubbing rubber down-stops and up-stops come into contact with the chassis frame and/or any roll-over protection system (ROPS) components. The shape of the down-stop and the up-stop increases resistance per distance compressed. Ultimately, rubber stops inside the damper are engaged, again with increasing resistance per distance compressed. The dampening and motion resisting components themselves become engaged in increasing frequency, combining for increased resistance over the total cab motion stroke, thus providing smooth and gradual motion at the end of stroke. In addition, the down-stops and up-stops also ensure that the dampers are never taken to full stroke by heavy cabs.

Moreover, the front-to-back and side-to-side motion may be controlled by longitudinal links and panhard bars. These links may be mounted between the cab suspension superstructure and the vehicle chassis to minimize front-to-back and side-to-side motion, respectively.

Further, in accordance with several embodiments, the cab suspension superstructure of the disclosed system may be configured to be connected to the cab frame at four cab mounting pads and ROPS tubes. The dampers, longitudinal links, panhard bars, drop links, down-stops and ROPS mounting parts may be assembled onto the pads, reducing assembly time in the main vehicle assembly line or manufacturing cell. For example, the cab suspension system may be assembled to the vehicle frame prior to placement of the cab on the cab suspension superstructure of the disclosed system. All of the connecting joints may be bolted, including the four ROPS bolts, washers, up-stops and locknuts. In addition, the top of the cab suspension system may include two piloting tapered pins in opposite corners to help align the cab frame to the suspension system. This may ensure the line-up of the bolt holes that are utilized to secure the cab frame to the suspension system. The cab superstructure may also serve as an assembly fixture to align the four ROPS pads. The pins may allow the cab to be dropped onto the cab superstructure quickly and may place the cab accurately. The cab superstructure incorporates all of the upper suspension mounting features, thus allowing the bottom of the cab to remain flat, or to assume a structural presentation that facilitates its manufacture and transport. Moreover, the suspension superstructure may accommodate many different cabs with less adaptation than known arrangements (with little or no change to the frame).

Additionally, the chassis frame may also be modified to provide mounting points for the links, dampers, torsion bar, and ROPS bolts. For example, the chassis frame may include an inner ROPS tube that provides a mechanical stop for roll-over motion. The relationship between the outer (on cab superstructure) and inner (on chassis frame) ROPS tubes allow the ROPS bolts to be put in almost pure tension during roll-over, thus providing a robust design. The tube-in-tube design may protect the springs, prevent extreme side-to-side motion during roll-over, and allow for any water and dirt that may enter into the ROPS system to exit. This reduces the possibility of rust and dirt buildup in the ROPS system.

Moreover, as indicated above, the disclosed system may also include circumferential bump stops positioned at each corner of the system. Specifically, in several embodiments, each bump stop may be coupled to one of the outer ROPS tubes so as to extend downwards towards a suspension platform of the chassis frame. In addition, each bump stop may define a curved or arced shape that permits the bump stop to extend around a portion of the circumference of its corresponding ROPS tube. For example, as will be described below, the bump stops may be configured to extend circumferentially around a 90 degree section of each tube along the corners of the system. As such, the bump stops may prevent the outer ROPS tubes from contacting the suspension platforms regardless of the direction in which the cab is displaced during normal operation of the work vehicle.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front tracks 12, a pair or rear tracks 16 and a chassis 16 coupled to and supported by the tracks 12, 14. As is generally understood, the work vehicle 10 may also include an engine and a transmission (not shown) supported by the chassis 16, which may be used to rotationally drive the front tracks 12 and/or the rear tracks 14. Additionally, an operator's cab 18 may be supported by a portion of the chassis 16 and may house various control devices (not shown) for permitting an operator to control the operation of the work vehicle 10. As will be described below, the cab 18 may be mounted on the chassis 16 via the disclosed suspension system 20.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include tires in lieu of tracks 12, 14 or may include a combination of tires and tracks.

Figure 2:
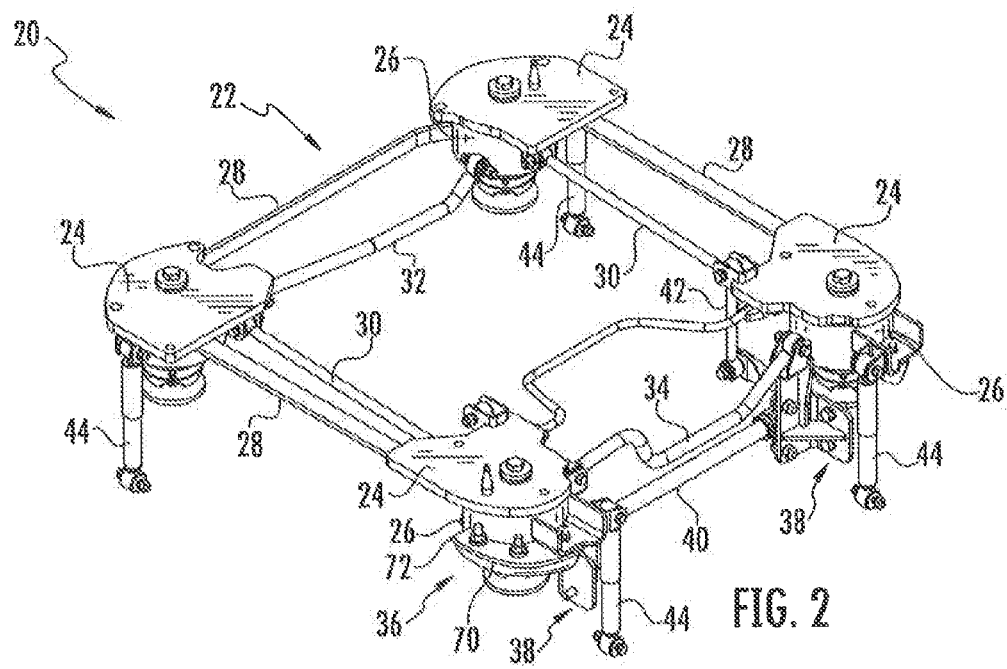
FIG. 2 illustrates a top perspective view of one embodiment of a cab suspension system in accordance with aspects of the present subject matter.
Figure 3:
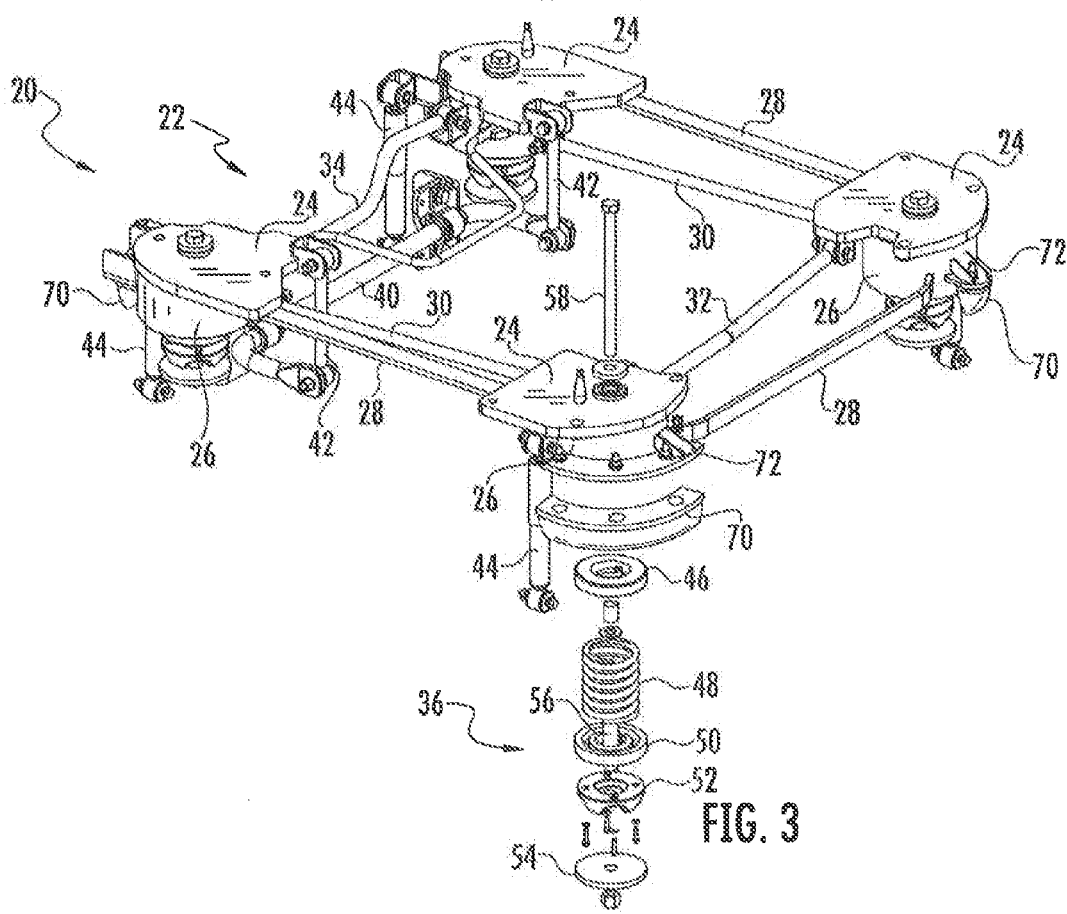
FIG. 3 illustrates another top perspective view of the cab suspension system shown in FIG. 2, particularly illustrating a mounting assembly of the system exploded out for purposes of illustration.
Figure 4:
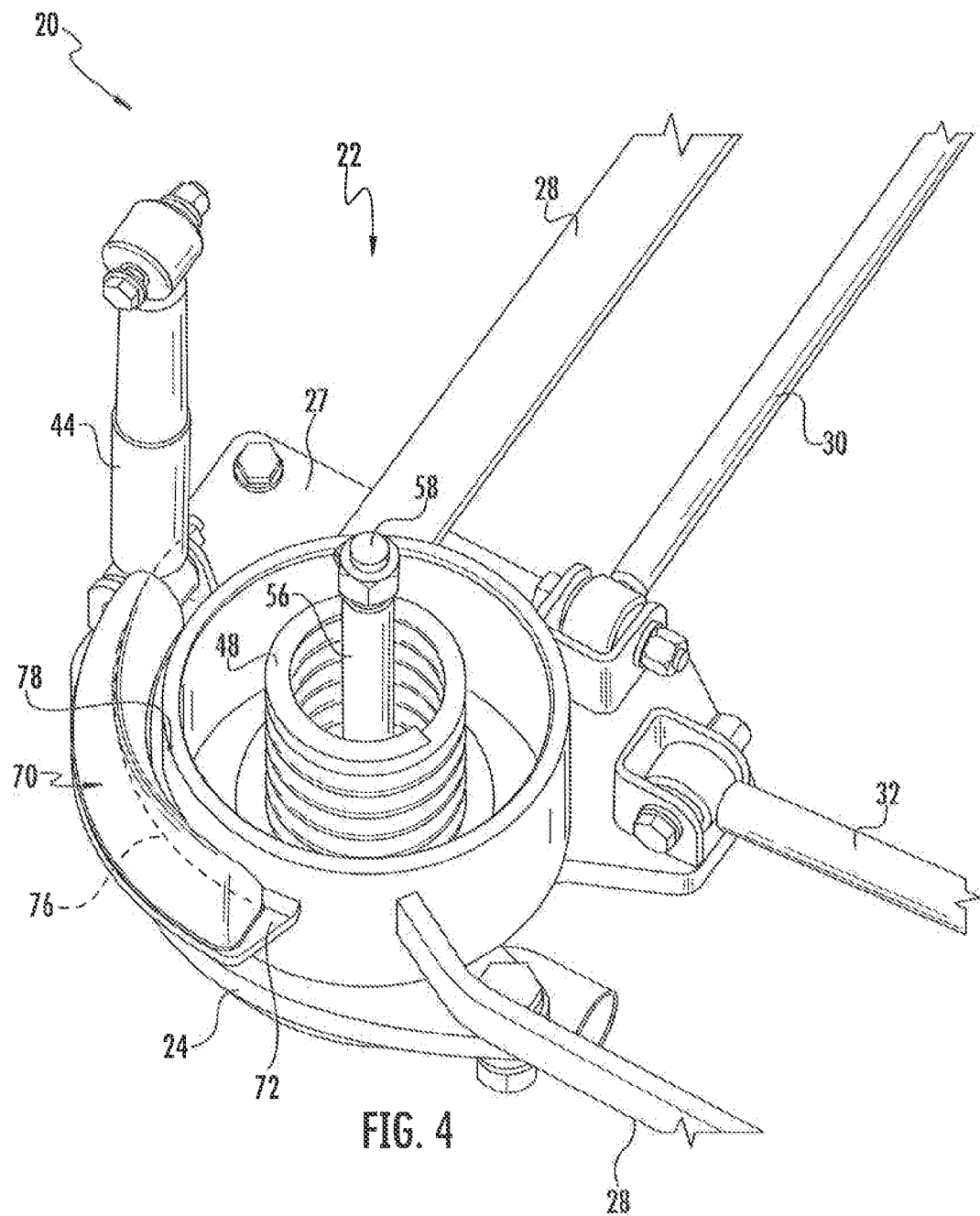
FIG. 4 illustrates a bottom perspective view of one of the corners of the cab suspension system shown in FIGS. 2 and 3.

Referring now to FIGS. 2-4, various views of one embodiment of a cab suspension system 20 suitable for use with the work vehicle 10 shown in FIG. 1 are illustrated in accordance with aspects of the present subject matter. Specifically, FIG. 2 illustrates a perspective view of the cab suspension system 20. FIG. 3 illustrates another top perspective view of the suspension system 20 shown in FIG. 2 rotated 180 degrees, particularly illustrating various components of the system 20 being exploded out at one of the corners of the system 20. Additionally, FIG. 4 illustrates a bottom perspective view of one of the corners of the suspension system 20.

In general, the suspension system 20 may define a framework structure that is intended to be coupled between the chassis 16 and the cab 18. As shown, the system 20 may generally include a suspension superstructure 22 configured to rest just below the cab 16 when assembled on the vehicle 10. The superstructure 22 may include a plurality of flattened areas or pads 24 for supporting matching mounting structures on the cab frame (see, e.g., FIG. 9), with each pad 24 being at one of four corners of the system 20. Additionally, the superstructure 22 may include a plurality of cylindrical outer tubes 26 extending from the pads 24. For example, as particularly shown in FIG. 4, each outer tube 26 may extend outwardly from a bottom surface 27 of one of the pads 24.

Moreover, various rods and/or links may be configured to extend between the pads 24 and/or tubes 26. For example, tie rods 28 may extend between one or more of the pads 24 and/or outer tubes 26 in order to maintain the spatial relationship between the pads 24 prior to mounting the cab 16 onto the superstructure 22. In certain embodiments, the tie rods 28 may be connected to the pads 24 and/or tubes 26 using a welded connection, bolts, brackets, or any other suitable connection. Additionally, a lateral link 30 may be provided on either side of the super structure 22 for control of longitudinal suspension motion. For example, as particularly shown in FIG. 4, the lateral links 30 may be pivotally connected to the bottom surface 27 of the pads 22. A rear link 32 may similarly tie the rear pads 24 to control lateral suspension motion, and may be similarly pivotally connected to the bottom surface 27 of the pads 22 (and/or between the outer tubes 26). Moreover, a front link 34 may extend between the front pads 24 and/or outer tubes 26 to further control lateral suspension motion.

Beneath the superstructure 22, the system 20 may also include mounting assemblies 36 configured to support the superstructure 22 (and the cab 18) on the chassis 16, as will be described below. Anti-roll structures 38 may be tied to one another by an anti-roll bar 40. Drop links 42 may link the front pads 24 to the anti-roll bar 40. Additionally, a damper 44 may be disposed at each corner of the system 20 to provide dampening of suspension motion. These dampers 44 may generally extend between the bottom surface 27 of the pads 24 (or some other superstructure component) and points on the chassis 16 (not shown in FIG. 2) where the suspension system 20 is mounted.

Figure 6:
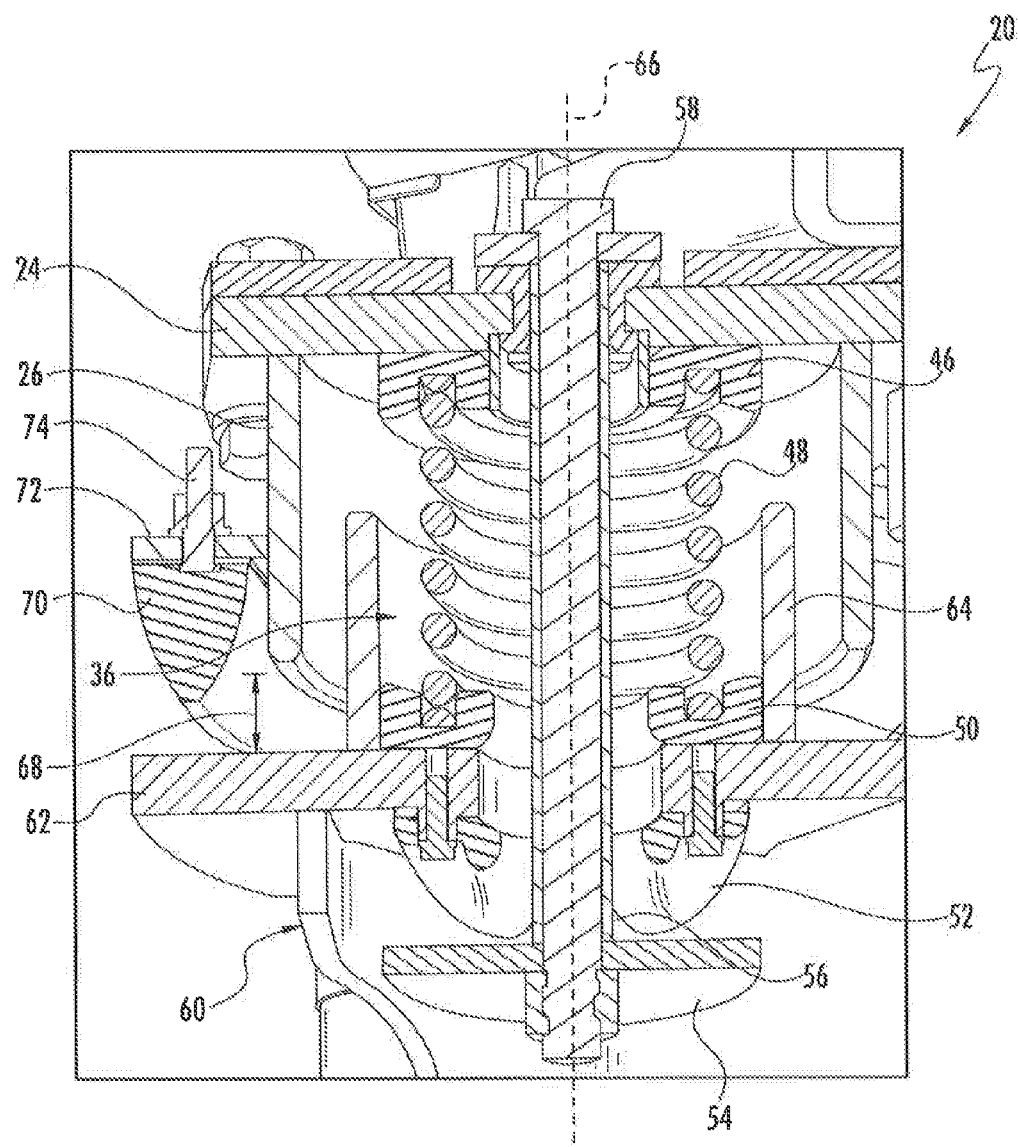
FIG. 6 illustrates a cross-sectional view through a portion of the cab suspension system and the frame shown in FIG. 5.

As particularly shown in FIGS. 3, 4 and 6, each mounting assembly 36 may be at least partially housed within one of the outer tubes 26. Each assembly 36 may include an upper rubber cup 46, a compression spring 48, a lower rubber cup 50, an up-stop 52 and a retaining plate 54. A spacer 56 extends through these elements, and the entire assembly 36 is held in place by a retaining bolt 58 (and a corresponding nut). As shown in FIG. 6, the upper rubber cup 46 may be configured to maintain the compression spring 48 centered in the outer tube 26 on the suspension superstructure 22. The lower rubber cup 50 may similarly maintain the compression spring 48 centered in an inner cylindrical tube 64 (FIG. 6) of the chassis 16. The rubber up-stop 52 may control upward suspension motion, while the lower retaining plate 54 may accept forces on the structure 22 when placed in compression by the bolt 56.

It should be appreciated that the shape of the up-stop 52 may allow for increased motion resistance as the structure is progressively compressed. That is, in the illustrated embodiment, rubber portions of the up-stop 52 may be thicker near an upper plate on which the rubber portions are mounted. The thinner sections provide a relatively lower spring constant than the thicker portions near the upper plate, such that increasing compression results in a greater spring constant resisting further motion. This, in conjunction with the rubber cups 46, 50 and springs 48, allows for excellent end-of-travel performance, and smooth and gradual motion at the end of stroke of the assemblies.

Figure 5:
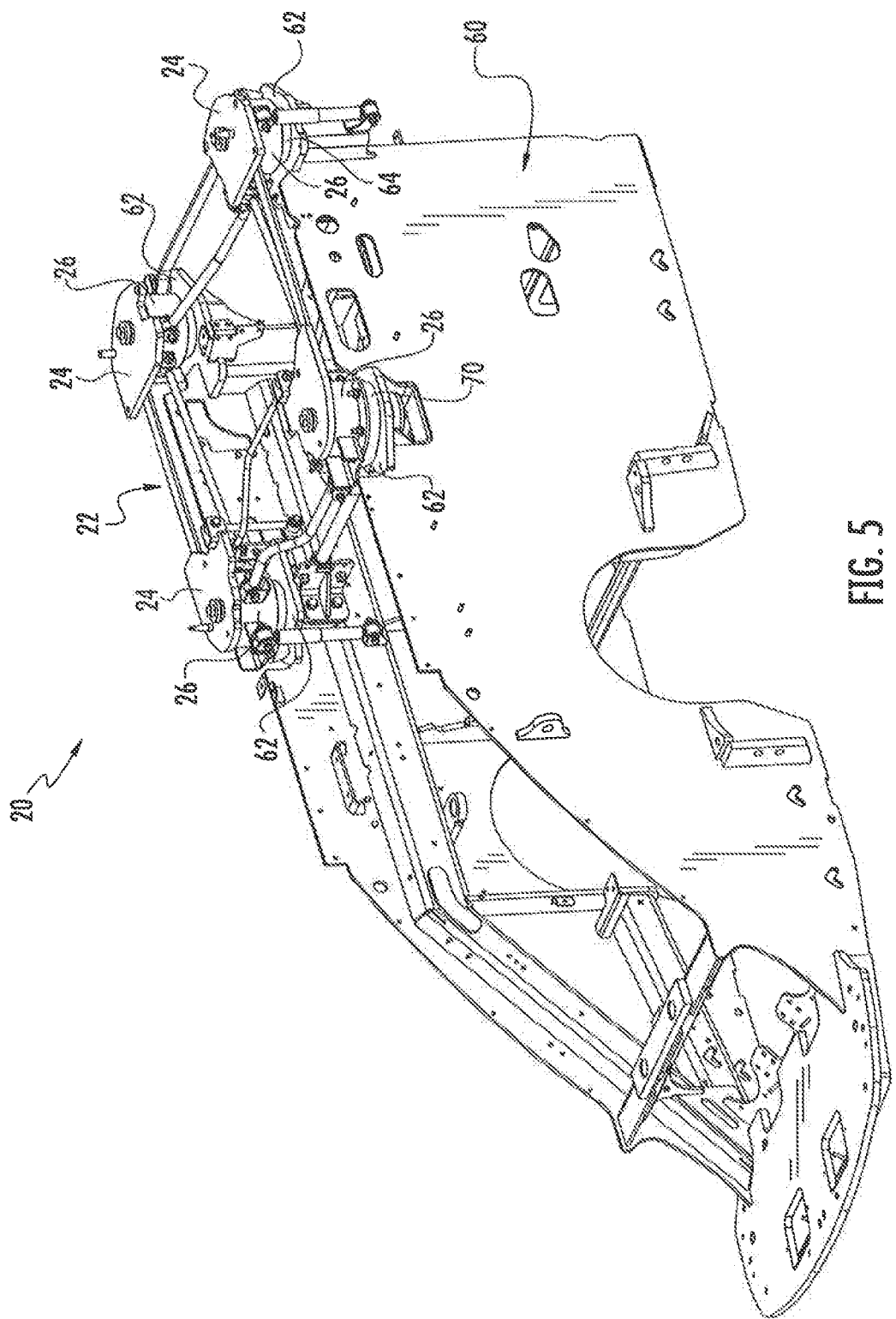
FIG. 5 illustrates a perspective view of the cab suspension system shown in FIGS. 2 and 3 mounted onto one embodiment of a work vehicle frame.

Referring now to FIG. 5, the suspension system 20 is shown installed on a frame 60 of the vehicle chassis 16. It should be appreciated that the particular configuration of the frame 60 shown in FIG. 5 is merely illustrated to provide one example of a suitable chassis frame 60. However, it should be appreciated that the present subject matter may generally be utilized with any suitable frame configuration.

As shown in FIG. 5, the chassis frame 60 may include a plurality of suspension platforms 62 configured to support the weight of the system 20 (and the cab 16). Each platform 62 may generally be configured to be aligned with one of the pads 24 when the superstructure 22 is installed onto the frame 60. Additionally, a cylindrical, inner tube 64 may extend upwardly from each platform 62 such that the inner tubes 64 are received within the outer tubes 26 when the pads 24 and platforms 62 are properly aligned during assembly.

Specifically, FIG. 6 illustrates a cross-sectional view through a pair of aligned pads 24 and platforms 62. As shown, the inner and outer tubes 64, 26 may be concentrically aligned along a vertical axis 66 when the superstructure 22 is installed into the frame 60, with the inner tube 64 being at least partially received within the outer tube 26. For example, when the suspension system 20 is not substantially loaded, the inner tube 64 may only be partially received within the outer tube 26 such that a gap 68 is defined between the outer tube 26 and the suspension platform 62. However, when a roll-over event occurs, the force exerted on the suspension system 20 may cause the spring 48 to be compressed so that the outer tube 26 is displaced relative to the inner tube 64 and subsequently contacts the suspension platform 62, thereby providing a mechanical stop to limit further movement of the system 20.

Referring now to FIGS. 2-4 and 6, the disclosed system 20 may also include a plurality of bump stops 70 configured to prevent the outer tubes 26 from contacting the suspension platforms 62 during normal vehicle operation. In several embodiments, the system 20 may include four bump stops 70, with each bump stop 70 being coupled to one of the outer tubes 26. For example, as shown in the illustrated embodiment, each bump stop 70 may be coupled to a lip or flange 72 of each outer tube 26 and may extend outwardly from each flange 72 in the direction of the suspension platforms 62. Specifically, as shown in FIG. 6, the bump stops 70 may be configured to extend from the flanges 72 so that a portion of each bump stop 70 is positioned below the bottom of each outer tube 26 when the suspension system 20 is a state of equilibrium. As such, when the suspension system 20 is loaded during vehicle operation and the outer tube 26 is displaced downward relative to the inner tube 64, the bump stop 70 may contact the suspension platform 62 and apply an upward force against the outer tube 26, thereby preventing the outer tube 26 from contacting the suspension platform 62.

However, as indicated above, it may be desirable for the outer tubes 26 to contact the suspension platforms 62 during a roll-over event. Thus, it should be appreciated that the configuration, shape and/or material of the bump stops 70 may be selected such that the bump stops 70 are capable of providing sufficient resistance to motion in order to prevent the outer tubes 26 from contacting the suspension platforms 62 during normal vehicle operation while also being capable of compressing under the forces associated with a roll-over event in a manner that allows for contact between the outer tubes 26 and the suspension platforms 62. For example, in several embodiments, the bottom stops 70 may be formed from a suitable resilient material, such as a rubber material or any other suitable elastomeric material, that provides the desired characteristics described above. In addition, as particularly shown in FIG. 6, in one embodiment, each bump stop 70 may define a tapered profile, with the width of the bump stops 70 decreasing in the direction of the suspension platforms 62. As such, the resistance to motion provided by each bump stop 70 may be increased with increased compression of the bump stop 70.

It should be appreciated that the bumps stops 70 may be coupled to the flanges 72 of the outer tubes 26 using any suitable attachment means known in the art. For example, as shown in FIG. 6, one or more suitable mechanical fasteners 74 (e.g., bolts, screws and/or the like) may be used to secure the bump stops 70 to the flanges 72. However, in alternative embodiments, the bump stops 70 may be coupled to the flanges 72 using any other suitable means, such as by adhering the bump stops 70 to the flanges 72.

Additionally, in accordance with several aspects of the present subject matter, each bump stop 70 may define a curved or arced shape that permits the bump stops 70 to extend circumferentially around a portion of each outer tube 26. For example, as particularly shown in FIG. 4, in one embodiment, each bump stop 70 may be shaped so as to extend circumferentially along a curved reference line 76 concentrically aligned with each outer tube 26 about its vertical axis 66. Moreover, as shown in FIG. 4, the bump stops 70 may be positioned on the outer tubes 26 so as to extend around a corner point 78 defined at a location on the circumference of each outer tube 26.

Figure 7:
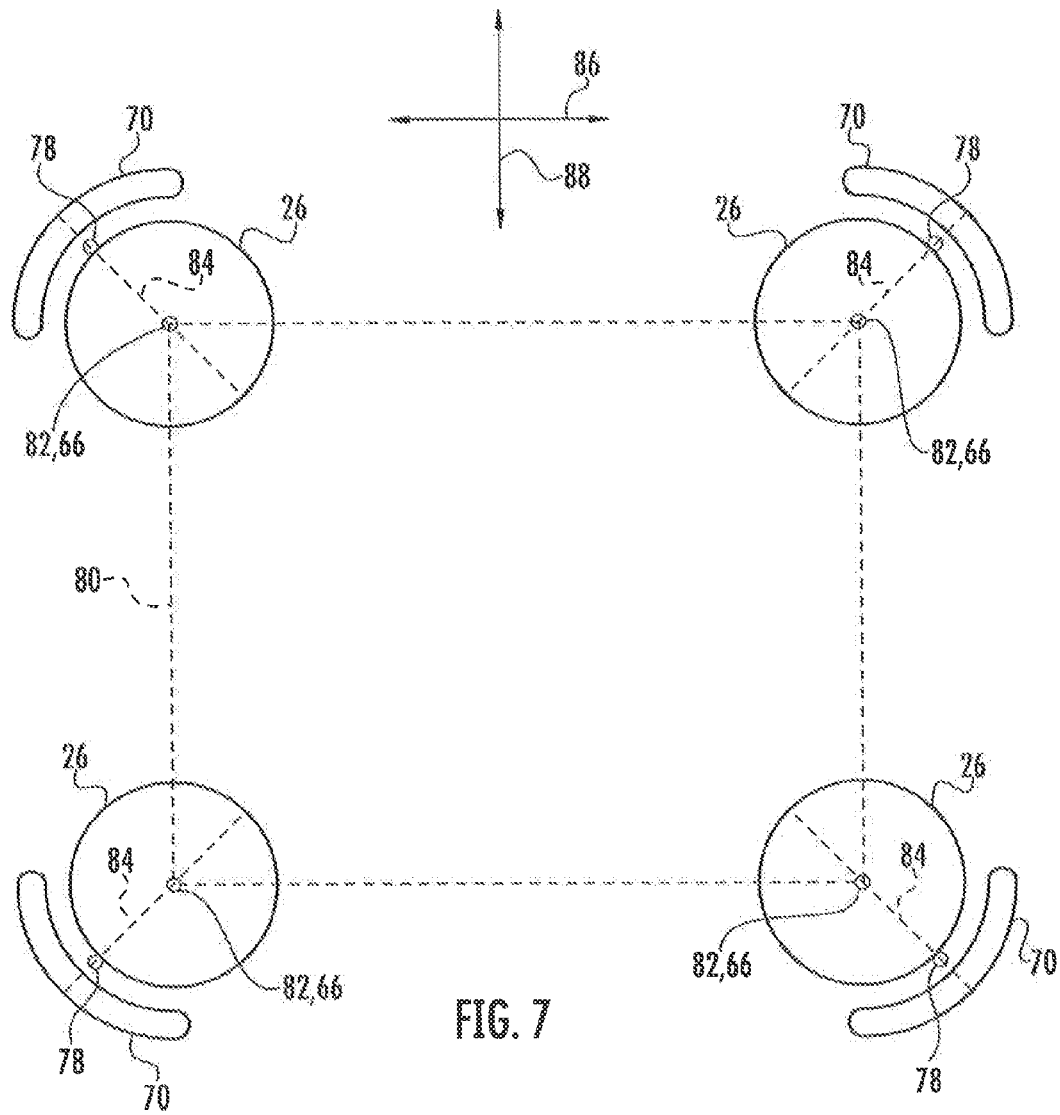
FIG. 7 illustrates a simplified, top view of the outer tubes of the cab suspension system shown in FIGS. 2-6.

It should be appreciated that, as used herein, the term "corner point 78" refers to a point along the circumference of each outer tube 26 that is aligned with and/or adjacent to one of the four corners of the suspension system 20. For example, FIG. 7 illustrates a simplified, top view of the four outer tubes 26 of the disclosed system 20 with an imaginary box 80 extending between the outer tubes 26 such that each corner 82 of the box 80 is aligned with one of the vertical axes 66 of the outer tubes 26. In such an embodiment, the corner point 78 of each outer tube 26 may be defined by the point along the circumference of each tube 26 at which a 45° reference line 84 extending outwardly from each corner 82 of the box 80 intersects such outer tube 26. Thus, as shown in FIG. 7, the bump stops 70 may extend around the corner points 78 of the outer tubes 26 by extending around the circumference of each outer tube 26 along either side of the corner point 78.

It should be appreciated that the bump stops 70 may be configured to extend around any suitable circumferential portions of the outer tubes 26 the encompass the center points 78. For example, as shown in FIGS. 4 and 7, on one embodiment, the bumps stops 70 may be centered at the corner points 78 and may extend around a 90° portion of the circumference of each outer tube 26 (i.e., by extending around the outer tube 26 45° on either side of the corner point 78). In such an embodiment, each bump stop 70 may provide motion resistance covering a 90° section of the potential cab displacement between the pitch and roll directions (indicated by arrows 86, 88 in FIG. 7), thereby preventing the outer tubes 26 from contacting the suspension platforms 62 regardless of the direction of any cab displacement (i.e., full 360° protection).

However, in alternative embodiments, it should be appreciated that the bump stops 70 need not be centered at the corner points 78. In addition, it should be appreciated that bumps stops 70 may generally extend around any suitable portion of the circumference of the outer tubes 26. For example, in other embodiments, the degree at which the bumps stops 70 extend around the circumference of the outer tubes 26 may range from about 45° to about 360°, such as from about 70° to about 180° or from about 80° to about 135° and all other subranges therebetween.

Referring now to FIGS. 8 and 9, different perspective views showing how a cab frame 90 may be mounted onto the suspension system 20 are illustrated in accordance with aspects of the present subject matter. As shown, at least two of the pads 24 of the super structure 22 may include alignment pins 92 extending upwardly to receive corresponding alignment apertures in the cab frame 90 (FIG. 9). These pins 92 may be tapered to cause progressive alignment as the cab frame 90 is lowered onto the suspension system 20. Specifically, FIG. 9 illustrates the cab frame 90 being lowered onto the suspension system 20. Various forms of cab frames may be accommodated, and these may include pads or feet 94 that contact and interface with the pads 24 of the suspension system 20. The feet 94 may include one or more apertures for fasteners that will align with similar apertures of the pads 24 as the cab frame 90 is lowered onto the alignment pins 92. The cab frame 92 may then be bolted to the suspension system 20 and subsequent assembly, wiring, and other operations may be carried out.

The cab suspension described above improves operator ride comfort and productivity by reducing road vibration from tire lugs or tracks, while also absorbing sudden jolts as the vehicle moves over rough terrain. A prototype of the system was tested to provide an operator ride index, in accordance with SAE standard J2834. The ride was found to be superior to front pivot suspension designs, providing improvements of 19-45% in ride index.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A work vehicle, comprising:
   a chassis frame including a suspension platform;
   a cab frame; and
   a suspension system coupled between the chassis frame and the cab frame, the suspension system comprising:
     a pad configured to be coupled to the cab frame;
     an outer tube extending from the pad in a direction of the suspension platform, the outer tube defining a circumference; and
     a bump stop coupled to the outer tube, the bump stop extending around a portion of the circumference of the outer tube,
     wherein at least a portion the bump stop extends below the outer tube such that the bump stop is configured to contact the suspension platform prior to the outer tube when the outer tube is moved in the direction of the suspension platform,
     wherein the circumference of the outer tube includes a corner point, wherein the bump stop is configured to extend around a portion of the circumference encompassing the corner point.

2. The work vehicle of claim 1, wherein the bump stop is centered about the corner point.

3. The work vehicle of claim 1, wherein the bump stop is configured to extend around a 90° section of the circumference of the outer tube.

4. The work vehicle of claim 1, wherein the bump stop defines a curved shape.

5. The work vehicle of claim 4, wherein the outer tube defines a vertical axis, the bump stop being concentrically aligned with outer tube along the vertical axis.

6. The work vehicle of claim 1, further comprising an inner tube extending from the suspension platform, the inner tube configured to be at least partially received within the outer tube.

7. The work vehicle of claim 6, wherein the inner and outer tubes are concentrically aligned along a vertical axis, further comprising a compression spring extending between the suspension platform and the pad along the vertical axis.

8. A cab suspension system for coupling a cab frame to a chassis frame of a work vehicle, the chassis frame including a suspension platform, the cab suspension system comprising:
   a pad configured to be coupled to the cab frame;
   an outer tube extending outwardly from the pad, the outer tube defining a circumference; and
   a bump stop coupled to the outer tube, the bump stop extending around a portion of the circumference of the outer tube,
   wherein at least a portion the bump stop extends below the outer tube such that the bump stop is configured to contact the suspension platform prior to the outer tube when the outer tube is moved in the direction of the suspension platform,
   wherein the circumference of the outer tube includes a corner point, wherein the bump stop is configured to extend around a portion of the circumference encompassing the corner point.

9. The cab suspension system of claim 8, wherein the bump stop is centered about the corner point.

10. The cab suspension system of claim 8, wherein the bump stop is configured to extend around a 90° section of the circumference of the outer tube.

11. The cab suspension of claim 8, wherein the bump stop defines a curved shape.

12. The cab suspension system of claim 11, wherein the outer tube defines a vertical axis, the bump stop being concentrically aligned with outer tube along the vertical axis.

13. The cab suspension system of claim 8, further comprising a compression spring configured to be at least partially housed within the outer tube.

* * * * *